(12) United States Patent
Six et al.

(10) Patent No.: US 10,434,835 B2
(45) Date of Patent: Oct. 8, 2019

(54) MONOTUBE ACTIVE SUSPENSION SYSTEM HAVING DIFFERENT SYSTEM LAYOUTS FOR CONTROLLING PUMP FLOW DISTRIBUTION

(71) Applicant: Tenneco Automotive Operating Company Inc., Lake Forest, IL (US)

(72) Inventors: Kristoff Six, Sint-Truiden (BE); Stefan Deferme, Sint-Truiden (BE); Peter Boon, Sint-Truiden (BE)

(*) Notice: Subject to any disclaimer, the term of this patent is extended or adjusted under 35 U.S.C. 154(b) by 296 days.

(21) Appl. No.: 15/434,435

(22) Filed: Feb. 16, 2017

(65) Prior Publication Data

US 2017/0240019 A1    Aug. 24, 2017

Related U.S. Application Data

(60) Provisional application No. 62/299,275, filed on Feb. 24, 2016.

(51) Int. Cl.

| | | |
|---|---|---|
| B60G 17/04 | (2006.01) | |
| B60G 17/08 | (2006.01) | |
| F15B 1/04 | (2006.01) | |
| F15B 11/17 | (2006.01) | |
| F15B 13/02 | (2006.01) | |
| F15B 13/04 | (2006.01) | |

(52) U.S. Cl.
CPC ......... B60G 17/0416 (2013.01); B60G 17/08 (2013.01); F15B 1/04 (2013.01); F15B 11/17 (2013.01); F15B 13/024 (2013.01); F15B 13/027 (2013.01); F15B 13/0401 (2013.01); *B60G 2500/02* (2013.01); *F15B 2211/20507* (2013.01); *F15B 2211/30* (2013.01)

(58) Field of Classification Search
CPC ............ F15B 1/021; F15B 1/265; F16F 9/463
See application file for complete search history.

(56) References Cited

U.S. PATENT DOCUMENTS

| | | |
|---|---|---|
| 3,385,589 A | 5/1968 | Erdmann |
| 3,559,027 A | 1/1971 | Arsem |
| 3,861,487 A | 1/1975 | Gill |
| 3,893,702 A | 7/1975 | Keijzer et al. |

(Continued)

FOREIGN PATENT DOCUMENTS

| | | |
|---|---|---|
| DE | 10164635 A1 | 1/2003 |
| DE | 102005001740 B3 | 7/2006 |

(Continued)

*Primary Examiner* — F Daniel Lopez
*Assistant Examiner* — Matthew Wiblin
(74) *Attorney, Agent, or Firm* — Harness, Dickey & Pierce, P.L.C.

(57) ABSTRACT

A hydraulic actuator circuit is disclosed for use with first and second shock absorbers, which each may include a piston disposed within a housing. The piston helps define upper and lower working chambers. The circuit may have a motor, a first pump, driven by the motor, and is associated with the first shock absorber and the motor. A second pump, driven by the motor, may be associated with the second shock absorber. A first accumulator communicates with both of the first and second pumps. A first switch valve may assist in controlling fluid flow into the chambers of the first shock absorber. A second switch valve may assist in controlling fluid flow into the chambers of the second shock absorber.

17 Claims, 9 Drawing Sheets

(56) References Cited

U.S. PATENT DOCUMENTS

| | | |
|---|---|---|
| 3,917,309 A | 11/1975 | Hegel et al. |
| 3,921,746 A | 11/1975 | Lewus |
| 3,954,255 A | 5/1976 | Keijzer et al. |
| 3,954,256 A | 5/1976 | Keijzer et al. |
| 3,979,134 A | 9/1976 | Keijzer et al. |
| 4,162,091 A | 7/1979 | Sano |
| 4,381,041 A | 4/1983 | Butoi |
| 4,743,046 A | 5/1988 | Schnittger |
| 5,024,459 A | 6/1991 | Kokubo et al. |
| 5,097,419 A | 3/1992 | Lizell |
| 5,137,299 A | 8/1992 | Jones |
| 5,162,995 A | 11/1992 | Ikemoto et al. |
| 5,215,327 A | 6/1993 | Gatter et al. |
| 5,222,759 A | 6/1993 | Wanner et al. |
| 5,231,583 A | 7/1993 | Lizell |
| 5,243,525 A | 9/1993 | Tsutsumi et al. |
| 5,269,556 A | 12/1993 | Heyring |
| 5,342,023 A | 8/1994 | Kuriki et al. |
| 5,398,788 A | 3/1995 | Lizell |
| 5,447,332 A | 9/1995 | Heyring et al. |
| 5,480,188 A | 1/1996 | Heyring et al. |
| 5,556,115 A | 9/1996 | Heyring |
| 5,562,305 A | 10/1996 | Heyring et al. |
| 5,601,306 A | 2/1997 | Heyring et al. |
| 5,601,307 A | 2/1997 | Heyring et al. |
| 5,678,847 A | 10/1997 | Izawa et al. |
| 5,682,980 A * | 11/1997 | Reybrouck ............ B60G 17/04 280/124.16 |
| 5,725,239 A | 3/1998 | de Molina |
| 5,785,344 A | 7/1998 | Vandewal et al. |
| 5,839,741 A | 11/1998 | Heyring |
| 5,915,701 A | 6/1999 | Heyring |
| 5,934,422 A | 8/1999 | Steed |
| 5,961,106 A | 10/1999 | Shaffer |
| 5,988,330 A | 11/1999 | Morris |
| 6,010,139 A | 1/2000 | Heyring et al. |
| 6,092,815 A | 7/2000 | Rutz et al. |
| 6,111,375 A | 8/2000 | Zenobi et al. |
| 6,155,545 A | 12/2000 | Noro et al. |
| 6,182,806 B1 | 2/2001 | Hasegawa |
| 6,217,047 B1 | 4/2001 | Heyring et al. |
| 6,270,098 B1 | 8/2001 | Heyring et al. |
| 6,338,014 B2 | 1/2002 | Heyring et al. |
| 6,367,830 B1 | 4/2002 | Annequin et al. |
| 6,519,517 B1 | 2/2003 | Heyring et al. |
| 6,588,777 B1 | 7/2003 | Heyring |
| 6,669,208 B1 | 12/2003 | Monk et al. |
| 6,761,371 B1 | 7/2004 | Heyring et al. |
| 6,830,256 B2 | 12/2004 | Bryant |
| 7,040,631 B2 | 5/2006 | Kotulla et al. |
| 7,055,832 B2 * | 6/2006 | Germain ............ B60G 17/0162 280/124.106 |
| 7,321,816 B2 | 1/2008 | Lauwerys et al. |
| 7,325,634 B2 | 2/2008 | Law et al. |
| 7,350,793 B2 | 4/2008 | Munday |
| 7,384,054 B2 | 6/2008 | Heyring et al. |
| 7,386,378 B2 | 6/2008 | Lauwerys et al. |
| 7,637,513 B2 | 12/2009 | Kotulla et al. |
| 7,686,309 B2 | 3/2010 | Munday et al. |
| 7,726,674 B2 | 6/2010 | VanDenberg et al. |
| 7,751,959 B2 | 7/2010 | Boon et al. |
| 7,789,398 B2 | 9/2010 | Munday et al. |
| 7,926,822 B2 | 4/2011 | Ohletz et al. |
| 8,016,306 B2 | 9/2011 | Isono |
| 8,029,002 B2 | 10/2011 | Maurer et al. |
| 8,070,171 B2 | 12/2011 | Wohlfarth |
| 8,408,569 B2 | 4/2013 | Keil et al. |
| 8,434,772 B2 | 5/2013 | Keil et al. |
| 8,556,047 B2 | 10/2013 | Kondou et al. |
| 8,573,606 B1 * | 11/2013 | Kim ............ B60G 13/08 267/64.17 |
| 8,672,337 B2 | 3/2014 | van der Knaap et al. |
| 8,814,178 B2 | 8/2014 | Moore et al. |
| 8,820,064 B2 | 9/2014 | Six et al. |
| 8,827,292 B2 | 9/2014 | Batsch et al. |
| 8,833,775 B2 | 9/2014 | Kim et al. |
| 8,966,889 B2 | 3/2015 | Six |
| 9,108,484 B2 | 8/2015 | Reybrouck |
| 9,114,846 B1 | 8/2015 | Ishikawa et al. |
| 9,272,598 B2 | 3/2016 | Kazmirski et al. |
| 9,481,221 B2 | 11/2016 | Reybrouck |
| 2001/0042435 A1 * | 11/2001 | Porter ............ F15B 1/265 91/445 |
| 2005/0252699 A1 | 11/2005 | Schedgick et al. |
| 2006/0175776 A1 | 8/2006 | Christophel et al. |
| 2007/0089924 A1 | 4/2007 | de la Torre et al. |
| 2008/0257626 A1 | 10/2008 | Carabelli et al. |
| 2009/0166989 A1 | 7/2009 | Atsushi |
| 2009/0192674 A1 | 7/2009 | Simons |
| 2009/0260935 A1 | 10/2009 | Avadhany et al. |
| 2009/0302559 A1 | 12/2009 | Doerfel |
| 2010/0006362 A1 | 1/2010 | Armstrong |
| 2010/0072760 A1 | 3/2010 | Anderson et al. |
| 2010/0207343 A1 | 8/2010 | Sano |
| 2011/0074123 A1 | 3/2011 | Fought et al. |
| 2011/0187065 A1 * | 8/2011 | Van Der Knaap ............ B60G 17/0152 280/5.507 |
| 2011/0221109 A1 | 9/2011 | Hinouchi |
| 2011/0266765 A1 | 11/2011 | Nowak |
| 2011/0302914 A1 | 12/2011 | Helbling |
| 2012/0049470 A1 | 3/2012 | Rositch et al. |
| 2012/0098216 A1 * | 4/2012 | Ryan ............ B60G 17/021 280/6.157 |
| 2012/0181127 A1 | 7/2012 | Keil et al. |
| 2014/0190156 A1 | 7/2014 | Reybrouck |
| 2015/0152888 A1 | 6/2015 | Six |
| 2016/0102686 A1 * | 4/2016 | An ............ E02F 9/2217 60/430 |

FOREIGN PATENT DOCUMENTS

| | | |
|---|---|---|
| DE | 102006058671 A1 | 3/2008 |
| DE | 102010007237 A1 | 9/2010 |
| EP | 1878598 A1 | 1/2008 |
| EP | 1953013 A2 | 8/2008 |
| EP | 2119580 A1 | 11/2009 |
| EP | 2145781 A1 | 1/2010 |
| JP | 2005121038 A | 5/2005 |
| JP | 2005145295 A | 6/2005 |
| JP | 2005280514 A | 10/2005 |
| JP | 2010000857 A | 1/2010 |
| KR | 20010011034 A | 2/2001 |
| KR | 1020090059260 | 6/2009 |
| WO | 2004030955 A1 | 4/2004 |
| WO | 2008005667 A2 | 1/2008 |
| WO | 2009124617 A1 | 10/2009 |
| WO | 2012173687 A1 | 12/2012 |

* cited by examiner

MONOTUBE ACTIVE SUSPENSION SYSTEM HAVING DIFFERENT SYSTEM LAYOUTS FOR CONTROLLING PUMP FLOW DISTRIBUTION

CROSS-REFERENCE TO RELATED APPLICATIONS

This application claims the benefit of U.S. Provisional Application No. 62/299,275, filed on Feb. 24, 2016. The entire disclosure of the above application is incorporated herein by reference.

FIELD

The present disclosure relates to an active suspension system, and more particularly to various embodiments of active suspension systems that incorporate a leveling system in conjunction with the active suspension system.

BACKGROUND

This section provides background information related to the present disclosure which is not necessarily prior art.

Suspension systems are provided to filter or isolate the vehicle's body (sprung portion) from the vehicle's wheels and axles (unsprung portion) when the vehicle travels over vertical road surface irregularities as well as to control body and wheel motion. In addition, suspension systems are also used to maintain an average vehicle attitude to promote improved stability of the vehicle during maneuvering. The typical passive suspension system includes a spring and a damping device in parallel with the spring which are located between the sprung portion and the unsprung portion of the vehicle.

Hydraulic actuators, such as shock absorbers and/or struts, are used in conjunction with conventional passive suspension systems to absorb unwanted vibration which occurs during driving. To absorb this unwanted vibration, hydraulic actuators include a piston located within a pressure cylinder of the hydraulic actuator. The piston is connected to one of the unsprung portion or suspension and the sprung portion or body of the vehicle through a piston rod. The pressure tube is connected to the other of the unsprung portion and sprung portion of the vehicle. Because the piston is able to restrict the flow of damping fluid within the working chamber of the hydraulic actuator when the piston is displaced within the pressure cylinder, the hydraulic actuator is able to produce a damping force which counteracts the vibration of the suspension. The greater the degree to which the damping fluid within the working chamber is restricted by the piston, the greater the damping forces which are generated by the hydraulic actuator.

In recent years, substantial interest has grown in automotive vehicle suspension systems which can offer improved comfort and road handling over the conventional passive suspension systems. In general, such improvements are achieved by utilization of an "intelligent" suspension system capable of electronically controlling the suspension forces generated by hydraulic actuators.

Different levels in achieving the ideal "intelligent" suspension system called a semi-active or a fully active suspension system are possible. Some systems control and generate damping forces based upon the dynamic forces acting against the movement of the piston. Other systems control and generate damping forces based on the static or slowly changing dynamic forces, acting on the piston independent of the velocity of the piston in the pressure tube. Other, more elaborate systems, can generate variable damping forces during rebound and compression movements of the hydraulic actuator regardless of the position and movement of the piston in the pressure tube. In addition to the above, there is a need for more flexible implementation of an active hydraulic system to accommodate different types of passenger vehicles and to maximize flexibility to vehicle manufacturers in mounting the various components of such a system.

SUMMARY

This section provides a general summary of the disclosure, and is not a comprehensive disclosure of its full scope or all of its features.

In one aspect the present disclosure relates to an hydraulic actuator circuit for use with first and second shock absorbers, wherein the first and second shock absorbers each include a piston disposed within a housing, and wherein the piston helps define upper and lower working chambers within the housing. The hydraulic actuator circuit may comprise a motor; a first pump, driven by the motor, and operably associated with the first shock absorber and with the motor; and a second pump, driven by the motor, and operably associated with the second shock absorber and with the motor. A first accumulator may be provided which is in communication with both of the first and second pumps. A first switch valve may be operably associated with the upper and lower working chambers of the first shock absorber, and with the first pump, for assisting in controlling fluid flow into the upper and lower chambers of the first shock absorber. A second switch valve may be operably associated with the upper and lower working chambers of the second shock absorber, and with the second pump, for assisting in controlling fluid flow into the upper and lower chambers of the second shock absorber.

In another aspect the present disclosure relates to an hydraulic actuator circuit for use with first, second, third and fourth shock absorbers, wherein the shock absorbers each include a piston disposed within a housing, and wherein the piston helps define upper and lower working chambers within the housing of each of the shock absorbers. The hydraulic actuator circuit may comprise a motor; a pump, driven by the motor; and a first accumulator in communication with pump. A first switch valve may be in direct communication with the pump for controlling flow to the shock absorbers. A second switch valve may be in direct communication with the first switch valve for controlling flow only to the first and second shock absorbers. A third switch valve may be in communication with the first switch valve for controlling flow only to the third and fourth shock absorbers.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
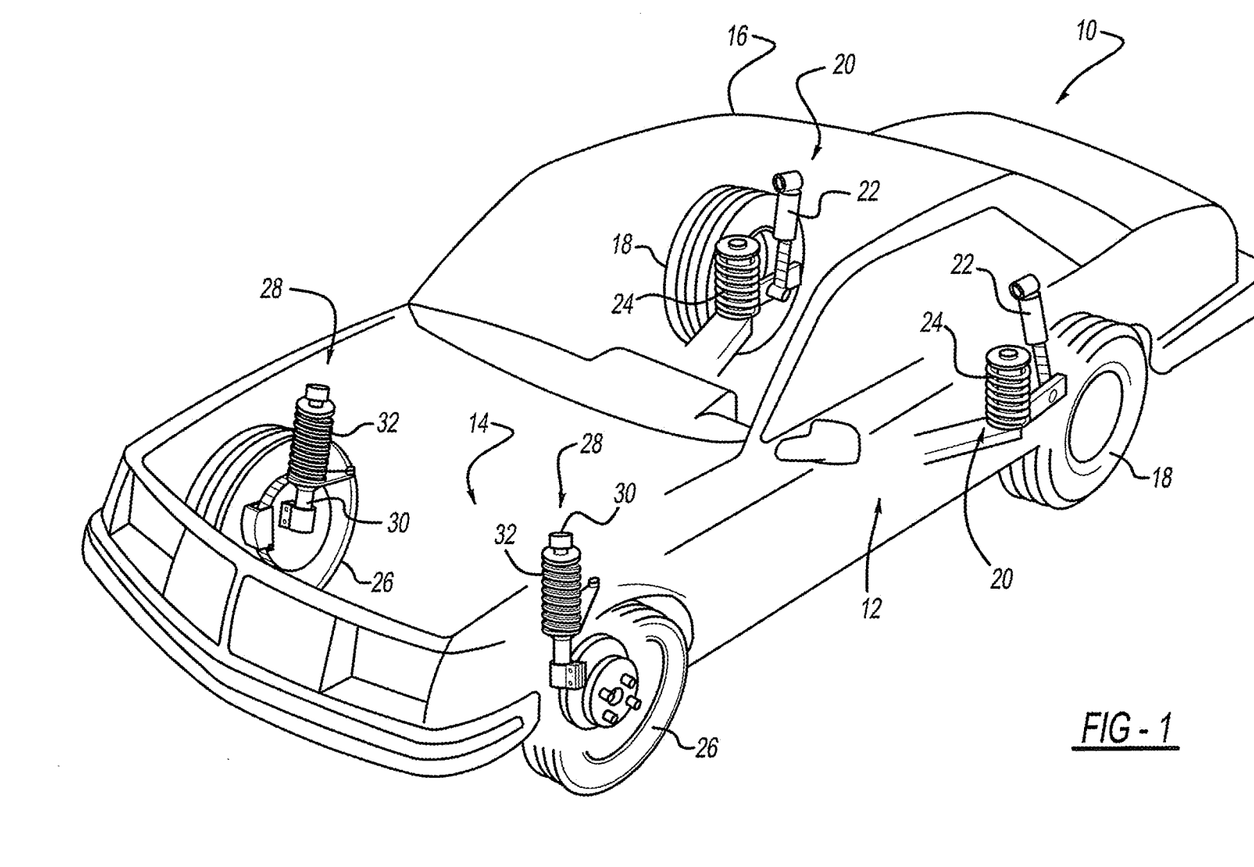
FIG. 1 is a diagrammatic illustration of a vehicle incorporating the leveling system and the active suspension system in accordance with the present disclosure.

The following description is merely exemplary in nature and is not intended to limit the present disclosure, application or uses. There is shown in FIG. 1 a vehicle incorporating a suspension system having a suspension system in accordance with the present disclosure and which is designated generally by the reference numeral 10. Vehicle 10 comprises a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of corner assemblies 20 which include a pair of shock absorbers 22 and a pair of helical coil springs 24. Similarly front suspension 14 includes a transversely extending front axle assembly (not shown) to operatively support the vehicle's front wheels 26. The front axle assembly is operatively connected to body 16 by means of a second pair of corner assemblies 28 which include a pair of shock absorbers 30 and by a pair of shaped helical coil springs 32. Shock absorbers 22 and 30 serve to dampen the relative motion of the unsprung portion (i.e., front and rear suspensions 12 and 14, respectively) and the sprung portion (i.e., body 16) of vehicle 10. While vehicle 10 has been depicted as a passenger car having front and rear axle assemblies, shock absorbers 22 and 30 may be used with other types of vehicles and/or in other types of applications such as vehicles incorporating independent front and/or independent rear suspension systems. Further, the term "shock absorber" as used herein is meant to be dampers in general and thus will include struts. Also, while front suspension 14 is illustrated having a pair of struts or shock absorbers 30, it is within the scope of the present invention to have rear suspension 12 incorporate a pair of struts or shock absorbers 30 if desired. As illustrated in FIG. 1, shock absorber 22 is separate from spring 24. In this configuration, the adjustable spring seat is disposed between the sprung and unsprung portions of the vehicle. Also, shock absorber 22 and spring 24 can be replaced with corner assemblies 28.

Figure 2:
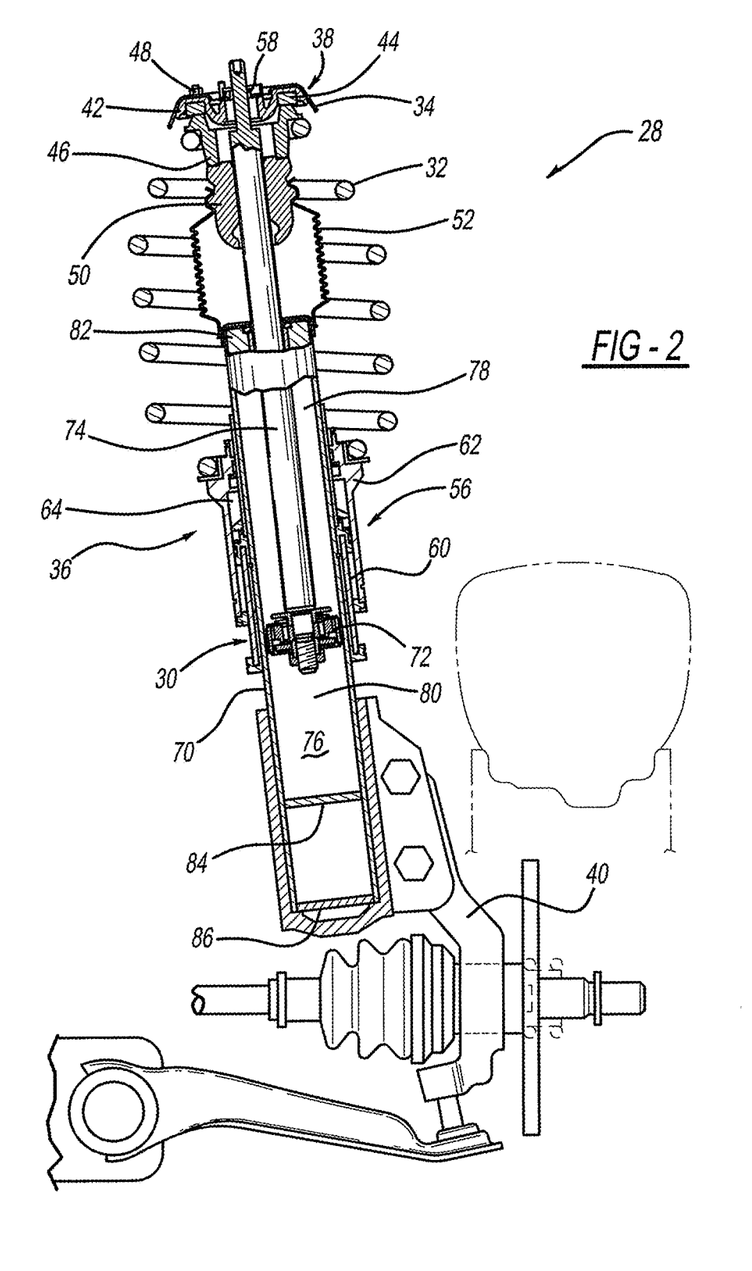
FIG. 2 is a schematic view of one of the corner assemblies including the hydraulic actuator illustrated in FIG. 1 illustrating the components of the hydraulic actuator.

Referring now to FIG. 2, the front corner assembly 28 for vehicle 10 is illustrated in greater detail. Body 16 defines a shock tower 34 comprising sheet metal of vehicle 10 within which is mounted a strut assembly 36 which comprises a telescoping device in the form of shock absorber 30, coil spring 32, a top mount assembly 38, and a knuckle 40 which is part of a wheel assembly. Strut assembly 36 including shock absorber 30, coil spring 32 and top mount assembly 38 are attached to vehicle 10 using shock tower 34. Top mount assembly 38, a part of the sprung portion of the vehicle, comprises a top mount 42, a bearing assembly 44, and an upper spring seat 46. Top mount 42 comprises an integral molded body and a rigid body member, typically made of stamped steel. Top mount assembly 38 is mounted to shock tower 34 by bolts 48. Bearing assembly 44 is friction fit within the molded body of top mount 42 to be seated in top mount 42 so that one side of bearing assembly 44 is fixed relative to top mount 42 and shock tower 34. The second side of bearing assembly 44 freely rotates with respect to the first side of bearing assembly 44, top mount 42, and shock tower 34.

The free rotating side of bearing assembly 44 carries upper spring seat 46 that is clearance fit to the outer diameter of bearing assembly 44. An elastomeric jounce bumper 50 is disposed between upper spring seat 46 and shock absorber 30. Elastomeric jounce bumper 50 comprises an elastomeric material which is protected by a plastic dirt shield 52.

A hydraulic adjustable lower spring seat assembly 56, which is part of the unsprung portion of the vehicle, is attached to shock absorber 30 and coil spring 32. Coil spring 32 is disposed between upper spring seat 46 and lower spring seat assembly 56 to isolate body 16 from front suspension 14. While shock absorber 30 is illustrated in FIG. 2, it is to be understood that shock absorber 22 may also include the features described herein for shock absorber 30.

Prior to the assembly of strut assembly 36 into vehicle 10, the pre-assembly of strut assembly 36 is performed. Elastomeric jounce bumper 50 and plastic dirt shield 52 are assembled to shock absorber 30. Coil spring 32 is assembled over shock absorber 30 and positioned within lower spring seat assembly 56. Upper spring seat 46 is assembled onto shock absorber 30 and correctly positioned with respect to coil spring 32. Bearing assembly 44 is positioned on top of upper spring seat 46 and top mount 42 is positioned on top of bearing assembly 44. This entire assembly is positioned within an assembly machine which compresses coil spring 32 such that the end of shock absorber 30 extends through a bore located within top mount assembly 38. A retaining nut 58 is threadingly received on the end of shock absorber 30 to secure the assembly of strut assembly 36.

Top mount 42 is designed as an identical component for the right and left hand sides of the vehicle, but it has a different orientation with respect to shock absorber 30 and its associated bracketry when it is placed on the right or left side of the vehicle.

Hydraulic adjustable spring seat assembly 56 includes an inner housing assembly 60 attached to shock absorber 30, and an outer housing assembly 62 that is attached to both shock absorber 30, and coil spring 32. Inner housing assembly 60 and outer housing assembly 62 define a fluid chamber 64. When fluid is added to fluid chamber 64, outer housing assembly 62 will move upward along shock absorber 30, as illustrated in FIG. 2. This movement will raise vehicle body 16 with respect to front suspension 14. When fluid is removed from fluid chamber 64, outer housing assembly 62 will move downward along shock absorber 30, as illustrated in FIG. 2. This movement will lower vehicle body 16 with respect to front suspension 14. Fluid chamber 64 is in fluid communication with shock absorber 30 as described below.

Shock absorber 30 is a mono-tube designed shock absorber comprising a pressure tube 70, a piston assembly 72 and a piston rod 74.

Pressure tube 70 defines a fluid chamber 76. Piston assembly 72 is slidably disposed within pressure tube 70 and divides fluid chamber 76 into an upper working chamber 78 and a lower working chamber 80. A seal is disposed between piston assembly 72 and pressure tube 70 to permit sliding movement of piston assembly 72 with respect to pressure tube 70 without generating undue frictional forces as well as sealing upper working chamber 78 from lower working chamber 80. Piston rod 74 is attached to piston assembly 72 and extends through upper working chamber 78 and through an upper end cap 82 which closes the upper end of pressure tube 70. A sealing system seals the interface between upper end cap 82, pressure tube 70, and piston rod 74. The end of piston rod 74 opposite to piston assembly 72 is adapted to be secured to the one of sprung and unsprung mass of vehicle 10. Valving within piston assembly 72 controls the movement of fluid between upper working chamber 78 and lower working chamber 80 during movement of piston assembly 72 within pressure tube 70. Because piston rod 74 extends only through upper working chamber 78 and not lower working chamber 80, movement of piston assembly 72 with respect to pressure tube 70 causes a difference in the amount of fluid displaced in upper working chamber 78 and the amount of fluid displaced in lower working chamber 80. The difference in the amount of fluid displaced is known as the "rod volume" and it is accommodated for by the use of a floating piston 84 as is well known in the art. An end cap 86 seals the end of pressure tube 70.

Figure 3:
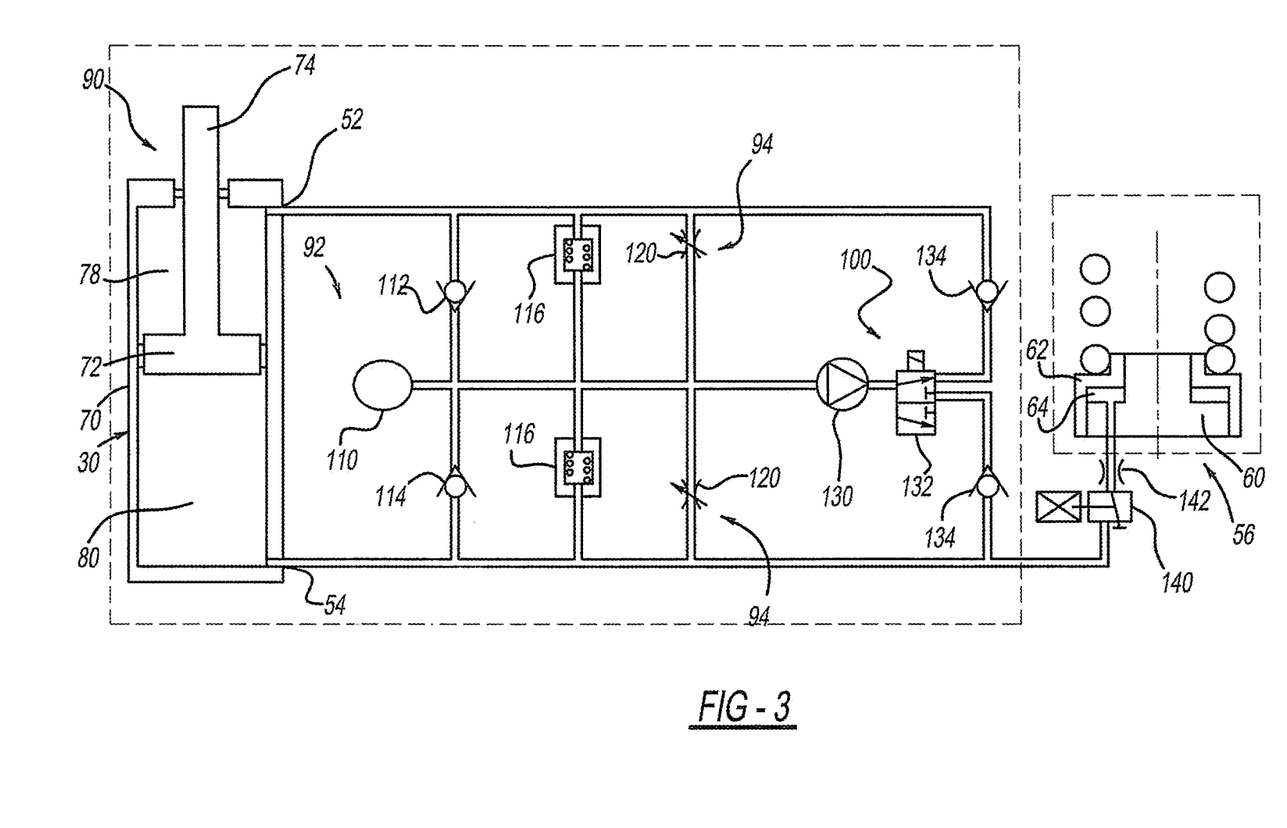
FIG. 3 is a schematic view of fluid connection between the hydraulic actuator for the active suspension system and the leveling system.

Referring to FIG. 3, a hydraulic actuator assembly 90 comprises shock absorber 30, a low pressure accumulator subsystem 92, one or more pressure divider subsystems 94, and a flow divider subsystem 100.

Low pressure accumulator subsystem 92 comprises a low pressure accumulator 110, a first check valve 112 and a second check valve 114. First check valve 112 allows fluid flow from low pressure accumulator 110 to upper working chamber 78 but prohibits fluid flow from upper working chamber 78 to low pressure accumulator 110. Second check valve 114 allows fluid flow from low pressure accumulator 110 to lower working chamber 80 but prohibits fluid flow from lower working chamber 80 to low pressure accumulator 110. Low pressure accumulator 110 is connected to a pair of blow-off valves 116, the one or more pressure divider subsystems 94, and flow divider subsystem 100.

The two pressure divider subsystems 94 illustrated in FIG. 3 include a rebound pressure divider subsystem 94 (the upper pressure divider subsystem) and a compression pressure divider subsystem 94 (the lower pressure divider subsystem). Each pressure divider subsystem 94 comprises a controlled restriction 120. In rebound pressure divider subsystem 94, controlled restriction 120 is located between upper working chamber 78 and flow divider subsystem 100, and between upper working chamber 78 and low pressure accumulator 110. In the compression pressure divider subsystem 94, controlled restriction 120 is located between lower working chamber 80 and flow divider subsystem 100, and between lower working chamber 80 and low pressure accumulator 110.

Pressure divider subsystem 94 creates a requested pressure in upper working chamber 78 and/or lower working chamber 80.

Flow divider subsystem 100 comprises a pump 130, a hydraulic switch valve 132 and a pair of check valves 134. Flow divider subsystem 100 controls the hydraulic energy from pump 130. Pump 130 receives fluid from low pressure accumulator 110. Fluid from pump 130 is directed to hydraulic switch valve 132. Hydraulic switch valve 132 can guide fluid flow to upper working chamber 78 and/or lower working chamber 80 depending on where it is needed. Hydraulic switch valve 132 can also divide the flow between upper working chamber 78 and lower working chamber 80 in a continuously controlled manner. While hydraulic switch valve 132 is illustrated using a symbol of a switch valve, this is not intended to limit the disclosure. Check valves 134 prohibit fluid flow from upper working chamber 78 and lower working chamber 80 to flow divided subsystem 100.

As illustrated in FIG. 3, fluid chamber 64 of hydraulic adjustable spring seat assembly 56 is in fluid communication with hydraulic actuator assembly 90. This connection allows for the changing of the static vehicle height and the compensation for static load changes by adjusting the height of body 16 with respect to front suspension 14 based upon the fluid pressures within hydraulic actuator assembly 90.

When an increased static (or quasi-static) push-out force must be created in shock absorber 30, hydraulic actuator assembly 90 will deliver this force by increasing the pressure in lower working chamber 80. This will be accomplished by having pump 130 provide high pressure fluid to lower working chamber 80 through hydraulic switch valve 132. When the fluid pressure in lower working chamber 80 rises above the static pressure in fluid chamber 64 of hydraulic adjustable spring seat assembly 56, a control valve 140 can be opened to allow fluid flow to enter fluid chamber 64 of hydraulic adjustable spring seat assembly 56. The fluid pressure in fluid chamber 64 will push outer housing assembly 62 upwards to raise vehicle body 16 and gradually take over the static load for vehicle body 16 from hydraulic actuator assembly 90. A restriction 142 limits the amount of fluid flow that leaves hydraulic actuator assembly 90 preserving pressure levels in hydraulic actuator assembly 90.

For the final adjustment, the fluid pressure in both upper working chamber 78 and lower working chamber 80 will be increased to maintain enough pressure to move hydraulic adjustable spring seat assembly 56 to its new position. When this final position of hydraulic adjustable spring seat assembly 56 is reached, control valve 140 will be closed.

When the static (or quasi-static) push-out force in lower working chamber 80 must be lowered, first the fluid pressure in upper working chamber 78 will be increased by providing pressurized fluid from pump 130 through hydraulic switch valve 132. This will provide a counter-acting force. The pressure in lower working chamber 80 will be low, near the pressure in low pressure accumulator 110. Control valve 140 can be opened and fluid will flow from fluid chamber 64 of hydraulic adjustable spring seat assembly 56 into the low pressure side of hydraulic actuator assembly 90. Restriction 142 will limit this flow to a level that is not distortive to the function of hydraulic actuator assembly 90. Gradually the counter-acting rebound force generated by hydraulic actuator assembly 90 will be reduced. Control valve 140 is preferably a low-flow bi-directional normally-closed hydraulic valve.

Figure 4:
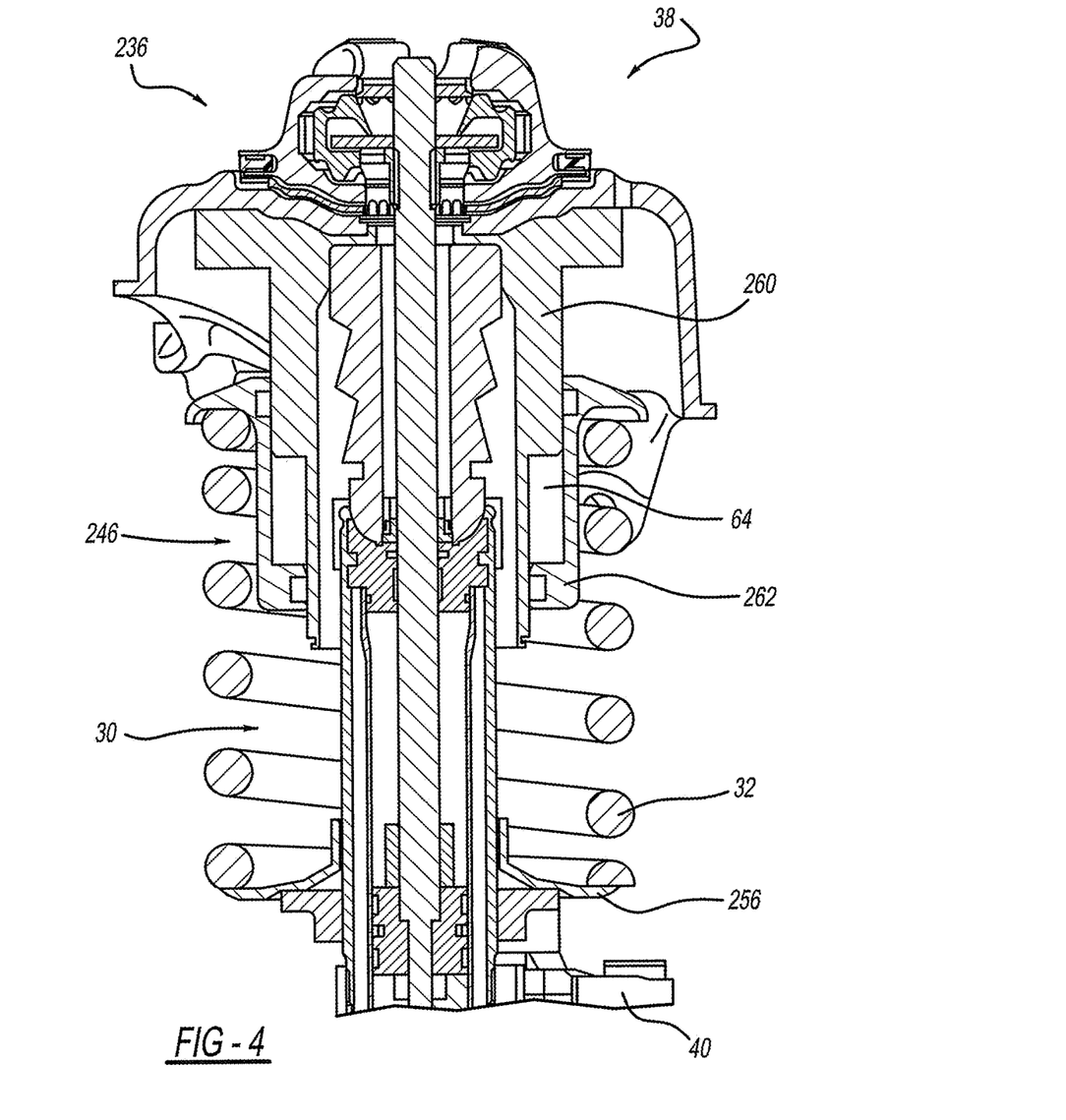
FIG. 4 is a schematic view of a corner assembly including a hydraulic actuator in accordance with another embodiment of the present disclosure.

The present disclosure is not limited to hydraulic adjustable lower spring seat assembly 56. FIG. 4 illustrates a strut assembly 236. Strut assembly 236 comprises shock absorber 30, coil spring 32, top mount assembly 38, a part of the sprung portion of the vehicle, and knuckle 40 which is a portion of the unsprung portion of the vehicle. The above discussion regarding strut assembly 36 in relation to top mount assembly 38 applies to strut assembly 236 also. The difference between strut assembly 236 and strut assembly 36 is that upper spring seat 46 has been replaced with upper spring seat assembly 246 and lower spring seat assembly 56 has been replaced with lower spring seat 256.

Upper spring seat assembly 246 is a hydraulically adjustable spring seat assembly which is attached to top mount assembly 38. Coil spring 32 is disposed between upper spring seat assembly 246 and lower spring seat 256. Hydraulic adjustable spring seat assembly 246 includes an inner housing assembly 260 attached to top mount assembly 38 and an outer housing assembly 262 that is attached to both inner housing assembly 260 and coil spring 32. Inner housing assembly 260 and outer housing assembly 262 define fluid chamber 64. When fluid is added to fluid chamber 64, outer housing assembly 262 will move downward along inner housing assembly 260, as illustrated in FIG. 4. This movement will raise vehicle body 16 with respect to front suspension 14. When fluid is removed from fluid chamber 64, outer housing assembly 262 will move upward along inner housing assembly 260, as illustrated in FIG. 4. This movement will lower vehicle body 16 with respect to front suspension 14. Fluid chamber 64 is in fluid communication with shock absorber 30 as described above.

The operation and function of hydraulically adjustable spring seat assembly 246 in conjunction with hydraulic actuator assembly 90 is the same as discussed above for adjustable spring seat assembly 56. FIG. 4 represents the adjusting of the upper spring seat rather than the lower spring seat illustrated in FIG. 2.

The advantages of the systems described above include a low cost addition of static load leveling, and height adjustment capability to the active suspension system, and the ability to lower energy consumption, and increase roll control performance in long corners of hydraulic actuator assembly 90.

Referring now to FIGS. 5-10, different topologies for the motor(s) and pump(s) can be configured will be discussed. In general, however, the following embodiments show different arrangements for providing power from the motor (or motors) to the pump(s) used. Collectively the motor and pump may be referred to as a "power pack". Implementations of the power pack are shown in the table below:

TABLE A

1. The location of the power pack:
    a. Integrated on the Monotube Acocar actuator;
    b. On the body of the vehicle, per corner;
    c. On the body of the vehicle, per axle;
    d. On the body of the vehicle, per vehicle.
2. The layout of the power pack:
    a. One motor with one pump;
    b. One motor with one dual head pump, i.e., 2 parallel pumps connected on the motor shaft;
    c. One motor with three parallel pumps;
    d. One motor with four parallel pumps;
    e. Multiple motors with pumps respectively, each independently driving one corner;
    f. Multiple motors with pumps respectively, each driving more than one corner;
    g. Multiple motors with pumps respectively, some independently driving one corner, some driving more than one corner;
    h. Multiple motors with pumps respectively, where each motor can have one or more than one pump, where each pump is driving one or more than one corner.
3. The routing of the generated flow from the pump to the actuators:
    a. One pump per corner;
    b. Combined pump(s) with flow routing via one or multiple switch valve(s);
    c. Combined pump(s) and accumulator(s) with pressure distribution via pressure controlled valves.
4. The routing of the return flow path:
    a. Independent per corner to the corresponding low pressure pump inlet;
    b. Connected to other corner(s), accessing multiple low pressure pump inlets;
    c. Connected to other corner(s) with one or multiple safety separation valve(s), accessing multiple low pressure pump inlets under certain conditions, otherwise accessing one low pressure pump inlet.

Table B below illustrates the various combinations of locations for the front and rear power packs, which may each be located at actuator (i.e., shock absorber) itself, at a corner of the vehicle, on an axle of the vehicle, or simply at some other location on the vehicle:

TABLE B

| | | Front Power Pack Location | | | |
|---|---|---|---|---|---|
| | | Actuator | Corner | Axle | Vehicle |
| Rear Power Pack Location | Actuator | X | X | X | |
| | Corner | X | X | X | |
| | Axle | X | X | X | |
| | Vehicle | | | | X |

For the following Table C, the various motor/pump configurations are illustrated, wherein the letter "M" indicates one motor and the letter "P" indicates one pump. Therefore, "MPP" indicates one motor driving two pumps. Although not indicated in Table C, the designation "MMPP" would indicate two motors driving two pumps.

TABLE C

| | | Amount of motors | | | |
|---|---|---|---|---|---|
| | | 1 | 2 | 3 | 4 |
| Amount of pumps | 1 | [MP] | | | |
| | 2 | [MPP] | 2x [MP] | | |
| | 3 | [MPPP] | [MP] & [MPP] | 3x [MP] | |
| | 4 | [MPPPP] | 2x [MPP] | 2x [MP] & [MPP] | 4x [MP] |

Figure 5:
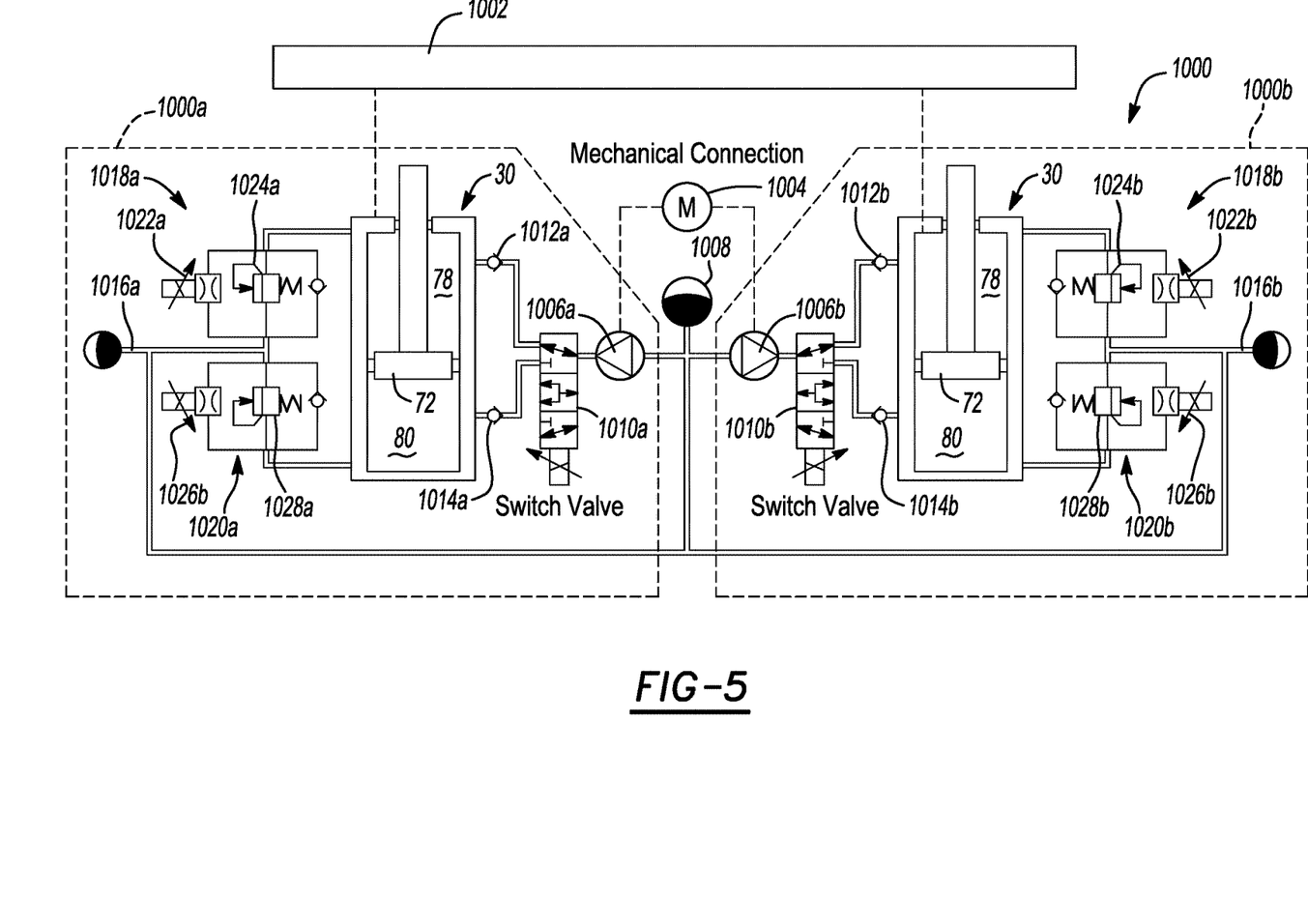
FIG. 5 is a high level schematic diagram of an embodiment of an actuator system of the present disclosure configured to be disposed on one axle of a vehicle, and making use of one motor and a pair of pumps which supply fluid to otherwise independent actuator subsystems.

Referring now to FIG. 5, one specific embodiment of a hydraulic actuator circuit 1000 is shown in accordance with the present disclosure. The actuator circuit 1000 of this embodiment is associated with one axle 1002 of the vehicle 10 and makes use of a single motor that drives a pair of fluid pumps associated with the actuator circuit 1000 (i.e., a "MPP" system). The actuator circuit 1000 includes the shock absorbers 30 that are associated with the two wheels of the axle 1002, and a motor 1004 for driving a pair of fluid pumps 1006*a* and 1006*b*. An accumulator 1008 operates in connection with both pumps 1006*a* and 1006*b*. Portion 1000*a* of actuator circuit 1000 is associated with one wheel (not shown) of the axle 1002 and portion 1000*b* is associated with the other wheel on the axle 1002. Like components in circuit portion 1000*b* are denoted by similar reference numbers but with the suffix "b".

Circuit portion 1000*a* includes a hydraulic switch valve 1010*a* for controlling flows into the upper working chamber 78, the lower working chamber 80, or both chambers, of the shock absorber 30. One way check valves 1012*a* and 1014*a* limit fluid flows to only one direction between the switch valve 1006*a* and the shock absorber 30. An accumulator 1016*a* communicates with a pair of valve assemblies 1018*a* and 1020*b*. Valve assembly 1018*a* includes a controlled restrictor device 1022*a* in parallel with a pressure relief valve 1024*a*, and communicates with the upper working chamber 78 of the shock absorber 30. Likewise, valve assembly 1020*a* includes a controlled restrictor device 1026*a* in parallel with a pressure relief valve 1028*a*, and communicates with the lower working chamber 80 of the shock absorber 30.

Figure 6:
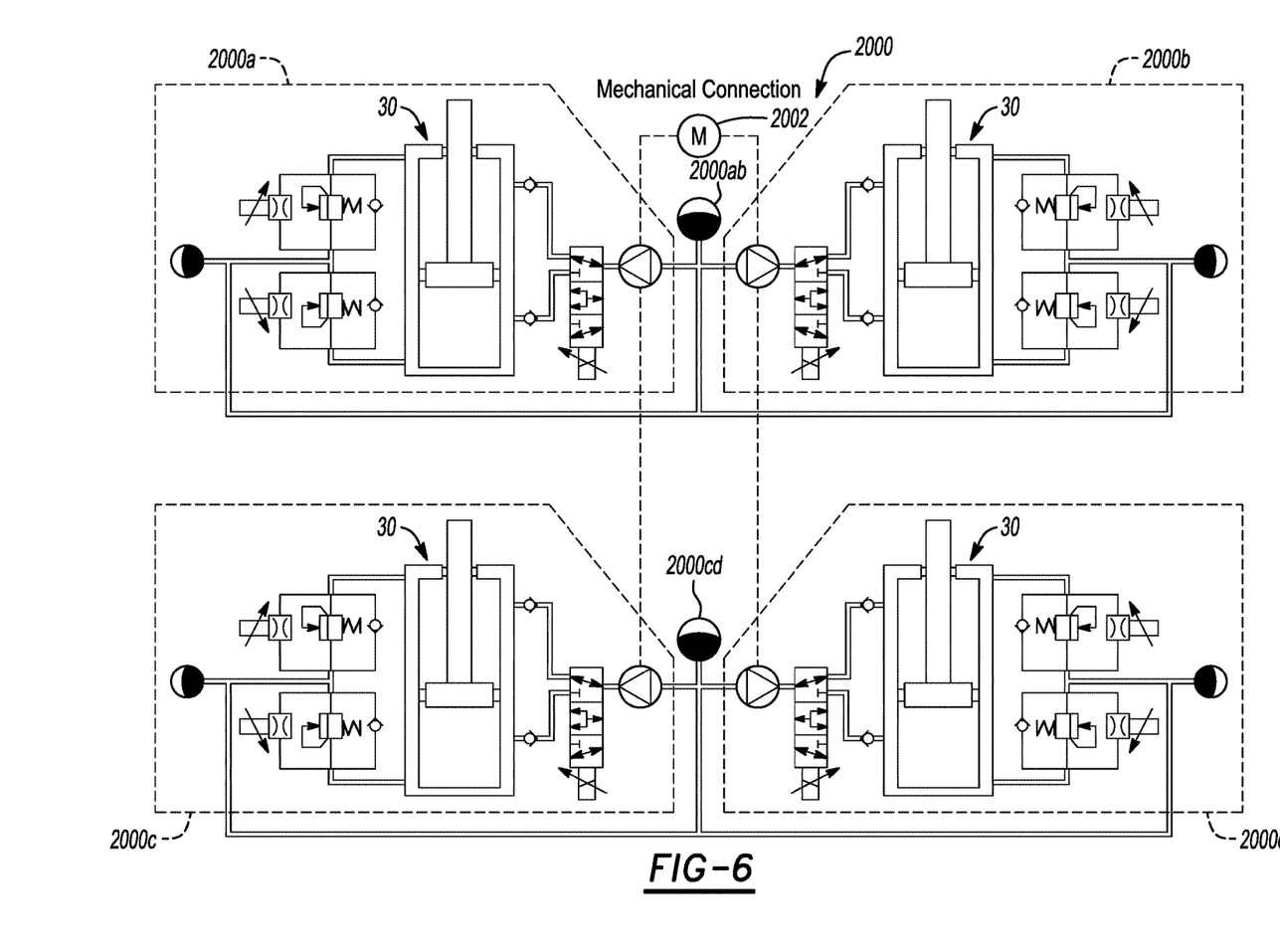
FIG. 6 is a high level schematic diagram of an embodiment of an actuator system of the present disclosure in which a single motor is used to drive separate fluid pumps associated with four otherwise independent actuator subsystems.

FIG. 6 shows another embodiment of a system 2000 in which a single motor is used to drive four independent fluid pumps (i.e., a "vehicle location" topology with a "MPPPP" configuration). The system 2000 includes four independent subsystems 2000*a*-2000*d*. All four of subsystems 2000*a*-2000 share a motor 2004, but each subsystem 2000*a*-2000*d* has its own pump 2008*a*-2008*d*. Thus, the motor 2004 drives all four pumps 2008*a*-2008*d*. Accumulator 2008*ab* operates with both of subsystems 2000 and 2000*b*, while accumulator 2008*cd* operates with both of subsystems 2000*cd*. The operation of each of subsystems 2000*a*-2000*d* is as described for subsystem 1000*a* of FIG. 5.

Figure 7:
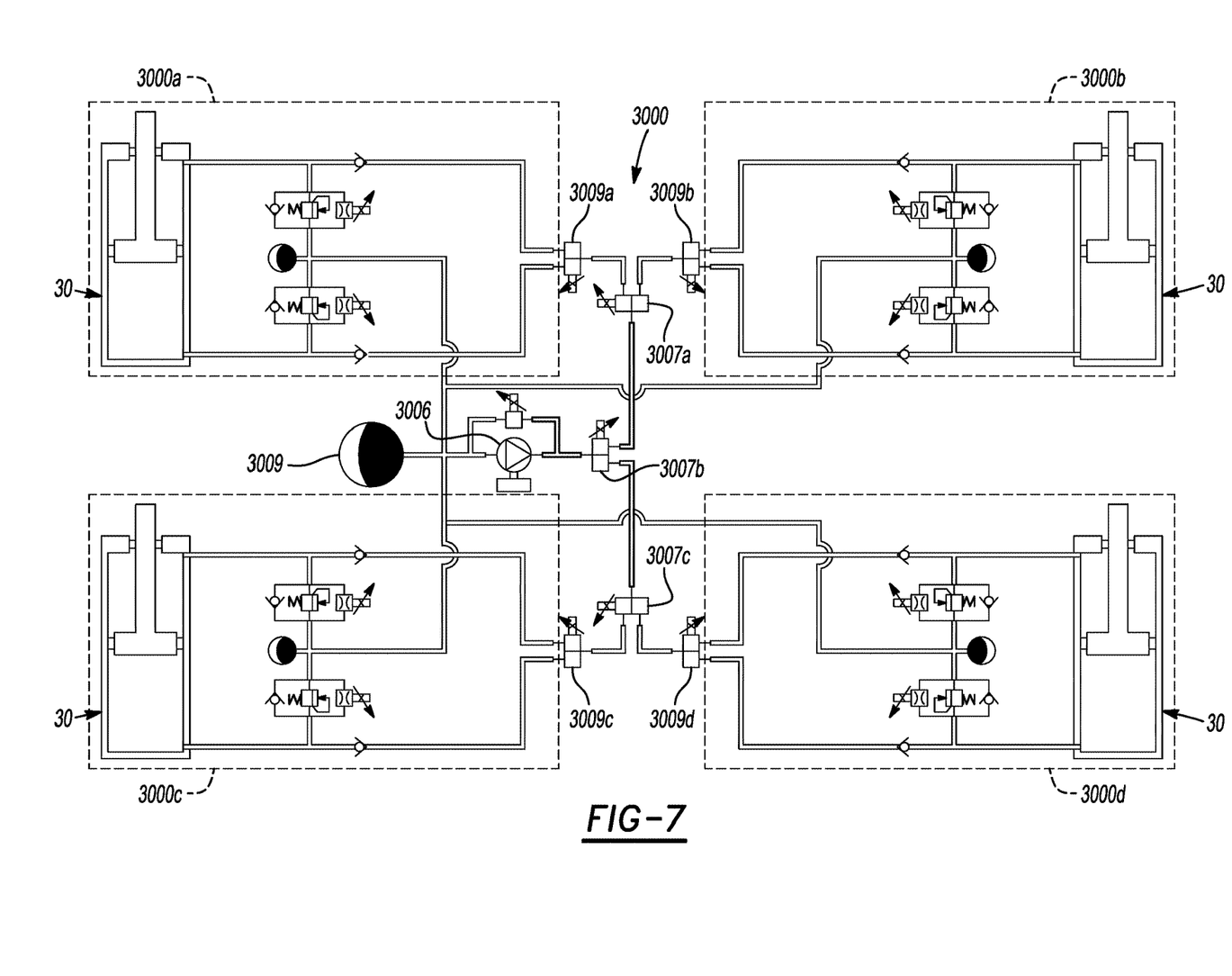
FIG. 7 is a high level schematic diagram of an embodiment of an actuator system of the present disclosure in which a single motor/pump subsystem is used together with a switching network to communicate fluids between four otherwise independent actuator subsystems.

FIG. 7 illustrates the configuration called out in line 3*b* of Table A where multiple actuators are connected to a single pump outlet. In this configuration, additional flow routing components become necessary to provide each actuator with a needed fluid flow. The embodiment shown in FIG. 7 is denoted by reference number 3000 and includes four distinct actuator subsystems 3000*a*-3000*d*. However, to route the flows from a single motor/pump subsystem 3006, additional switch valves are required. The system 3000 accomplishes the required flow routing by using three additional switch valves 3007*a*, 3007*b* and 3007*c*. An additional controlled restriction devices 3009*a*-3009*d* may be provided to interface each subsystem 3000*a*-3000*d* to either switch valve 3007*a* or 3007*c*. Thus, a total of seven additional switch valves are used in this embodiment to control the flows to each shock absorber 30 of each actuator subsystem 3000*a*-3000*d*. An additional accumulator 3009 may be used as a reservoir from which motor/pump subsystem 3006 can draw fluid when needed. Each of the subsystems 3000*a*-3000*d* includes components identical to the components of subsystem 1000*a* of FIG. 5, and otherwise operate in accordance with the subsystem 1000*a*.

Figure 8:
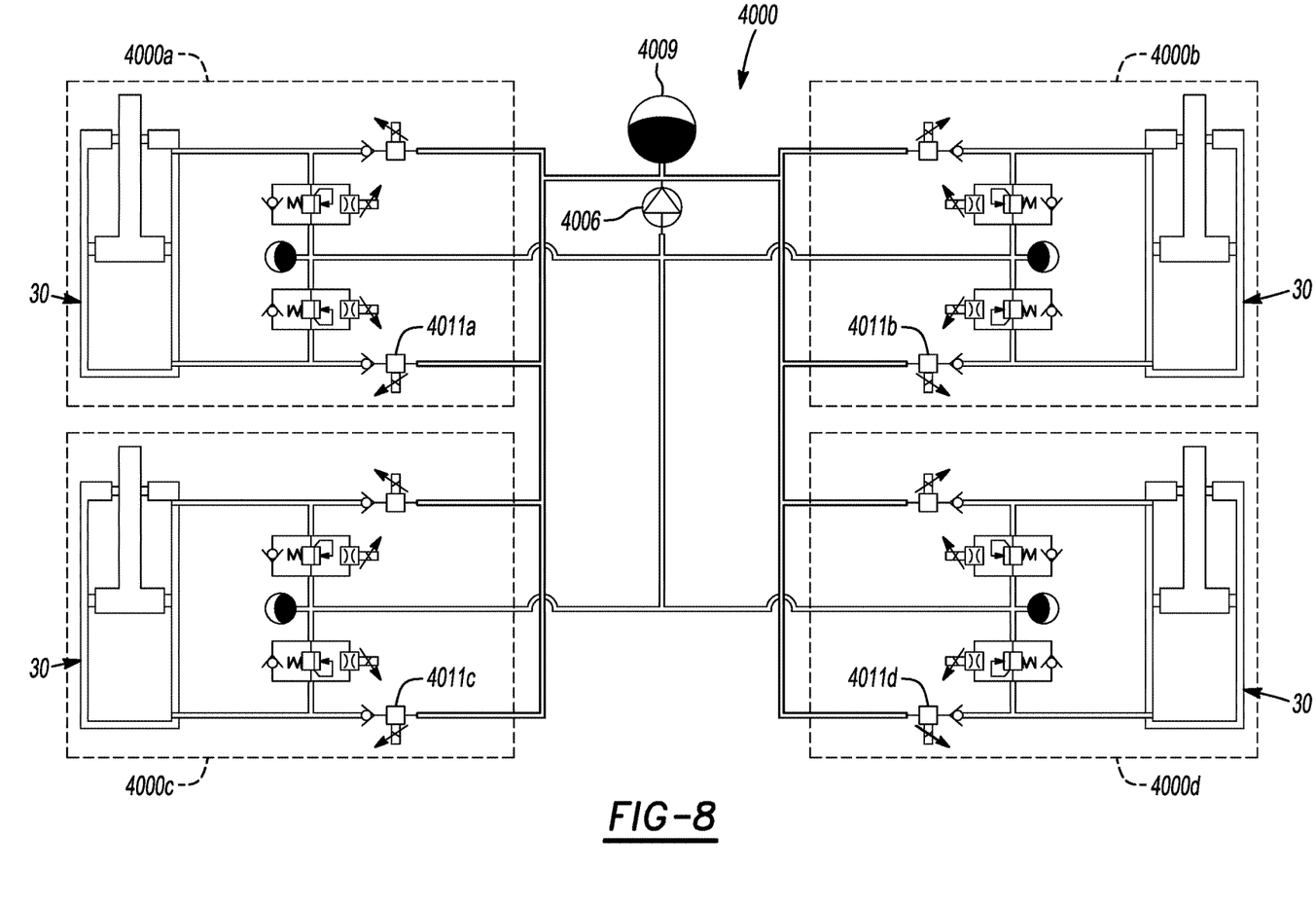
FIG. 8 is a high level schematic diagram of an embodiment of an actuator system of the present disclosure in which the pressure source is created by inserting an accumulator in a high pressure portion of the system after a single motor/pump subsystem.

Referring now to FIG. 8, shows a system 4000 in accordance with another embodiment of the present disclosure. The system 4000 is forms a configuration in accordance line 3*c* of Table A by making use of combined pumps and accumulators with pressure distribution accomplished via hydraulic valves. The system 4000 starts with a pressure source instead of a flow source. The pressure source is created by inserting an accumulator 4009 in a high pressure portion of the system 4000 after a single motor/pump subsystem 4006. This serves to momentarily "decouple" and buffer the provided pump energy from the delivered energy out to the each one of four actuator subsystems 4000*a*-4000*d*. This pressure source (i.e., accumulator 4009) can deliver its energy to the actuator subsystems 4000*a*-4000*d* via controlled restriction valves 4011*a*-4011*d* which regulate the pressure drop from the accumulator 4009 to the upper and lower working chambers of each shock absorber 30 associated with each actuator subsystem 4000*a*-4000*d*.

It will be noted that the four low pressure circuits in the corner systems are independent from each other. Previous systems were described in this way, mainly covering corner power pack layout implementations. But this approach can also be applied to axle or vehicle power pack layouts.

Figure 9:
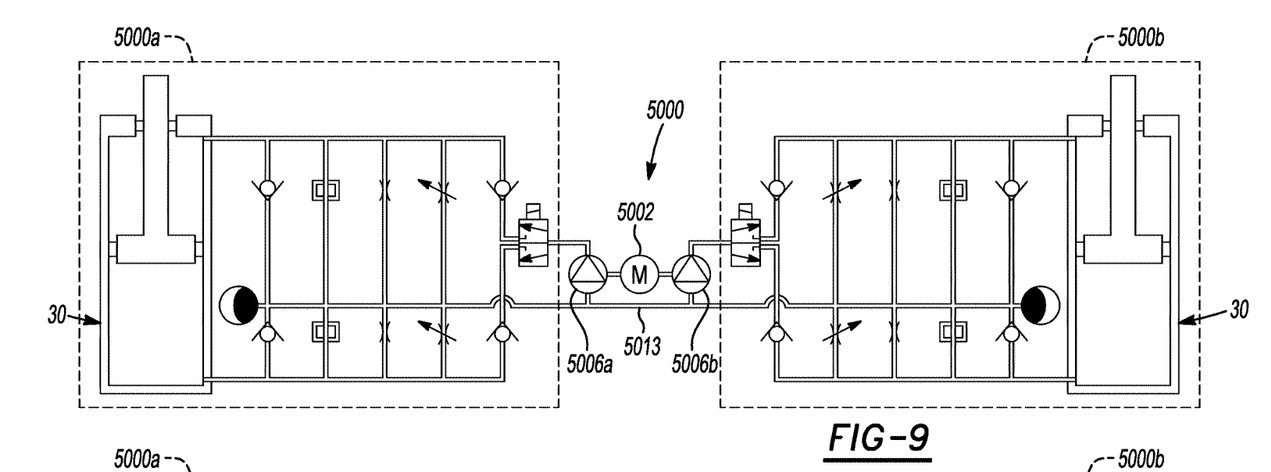
FIG. 9 is a high level schematic diagram of an embodiment of an actuator system of the present disclosure which makes use of an axle location topology with a single motor-multiple pump ("MPP") layout, and where the low pressure circuits of different actuator subsystems are connected via a common circuit line (i.e., flow path), and wherein the system uses a single motor to drive a pair of pumps.
Figure 10:
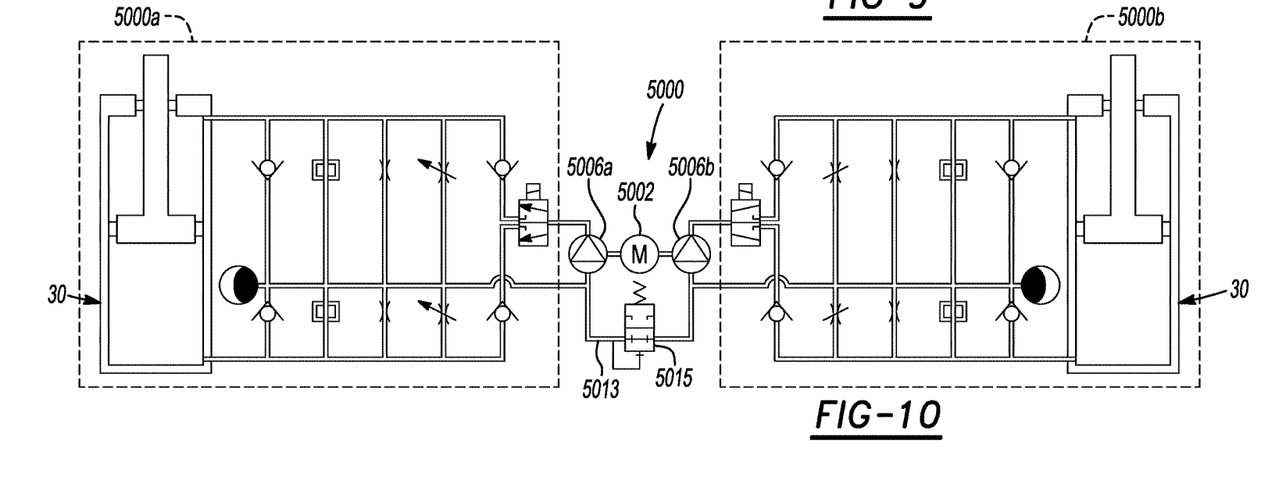
FIG. 10 is a high level schematic diagram of a modified version of the system of FIG. 9 in which the system includes a safety valve in a circuit line which communicates with a pair of otherwise independent actuator subsystems.

FIG. 9 illustrates a system 5000 in accordance with another embodiment of the present disclosure. This embodiment is also in accordance with configuration 4*b* listed in Table A, which makes use of an axle location topology with a single motor-multiple pump ("MPP") layout, and where the low pressure circuits of different actuator subsystems 5000*a* and 5000*b* are connected via circuit line 5013. The system 5000 has a single motor 5002 which drives a pair of pumps 5006*a* and 5006*b*. If a leakage should occur on one corner system of this configuration, this will affect all hydraulic connected corners, that is, the actuator subsystems 5000*a* and 5000*b* and their associated shock absorbers 30 at the corners of the vehicle 10. If the low pressure circuits of four actuator subsystems are coupled together, then all four actuator subsystems would be affected by the leakage condition. Such a leakage condition could be protected against, however, by including a safety valve system which separates or isolates the corner actuator subsystems in the event of a leakage condition that results in a decrease in system pressure in the low pressure circuit. Such a circuit configuration is shown in FIG. 10. In FIG. 10 the system 5000 has been modified to include a safety valve 5015 in circuit line 5013. In the event of a pressure drop in circuit line 5013 below a predetermined minimum pressure, safety valve 5015 switches into a state to interrupt the flow through circuit line 5013 between the low pressure circuits of actuator subsystems 5000*a* and 5000*b*.

In addition to the various configurations described above for FIGS. 5-10, further configuration modifications may be implemented to meet specific requirements and to tailor the system to allow for increased force generation, increased efficiency and cost optimization and component/system integration, all the while taking into account vehicle packaging and power constraints. Moreover, the systems described herein are not limited by the manner in which hydraulic energy or flow rate is generated, distributed and provided to corner systems. This can be done in a plurality of different ways.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An hydraulic actuator circuit for use with first and second shock absorbers, wherein said first and second shock absorbers each include a piston disposed within a housing, and wherein the piston helps define upper and lower working chambers within the housing, the hydraulic actuator circuit comprising:
    a motor;
    a first pump, driven by the motor, and operably associated with the first shock absorber and with the motor;
    a second pump, driven by the motor, and operably associated with the second shock absorber and with the motor;
    a first accumulator in communication with both of the first and second pumps;
    a second accumulator in communication with the first accumulator, and the upper and lower working chambers of the first shock absorber;
    a first switch valve operably associated with the upper and lower working chambers of the first shock absorber, and with the first pump, for assisting in controlling fluid flow into the upper and lower chambers of the first shock absorber; and
    a second switch valve operably associated with the upper and lower working chambers of the second shock absorber, and with the second pump, for assisting in controlling fluid flow into the upper and lower chambers of the second shock absorber.

2. The hydraulic actuator circuit of claim 1, further comprising:
    a first valve assembly associated with the upper working chamber of the first shock absorber and in communication with the second accumulator; and
    a second valve assembly operably associated with the lower working chamber of the first shock absorber and in communication with the second accumulator.

3. The hydraulic actuator circuit of claim 2, wherein the first and second valve assemblies each comprise a pressure relief valve.

4. The hydraulic actuator circuit of claim 3, wherein the third and fourth assemblies each comprise a pressure relief valve.

5. The hydraulic actuator circuit of claim 3, wherein the third and fourth valve assemblies each comprise a controlled restrictor.

6. The hydraulic actuator circuit of claim 2, wherein the first and second valve assemblies each comprise a controlled restrictor.

7. The hydraulic actuator circuit of claim 1, further comprising a third accumulator in communication with the first accumulator, and the upper and lower working chambers of the second shock absorber.

8. The hydraulic actuator circuit of claim 7, further comprising:
    a third valve assembly operably associated with the upper working chamber of the second shock absorber and in communication with the third accumulator; and
    a fourth valve assembly associated with the lower working chamber of the second shock absorber and in communication with the third accumulator.

9. The hydraulic actuator circuit of claim 1, further comprising a pair of one way check valves disposed between the first switch valve and the upper working chamber and the lower working chamber, respectively, of the first shock absorber.

10. The hydraulic actuator circuit of claim 1, further comprising a pair of one way check valves disposed between the second switch valve and the upper working chamber and the lower working chamber, respectively, of the second shock absorber.

11. The hydraulic actuator of circuit of claim 7, wherein the first, second and third accumulators are in direct communication with one another.

12. The hydraulic actuator circuit of claim 11, wherein the first, second and third accumulators are in direct communication with both of the first and second pumps.

13. The hydraulic actuator of claim 1, further comprising:
   a third pump, driven by the motor, and operably associated with a third shock absorber; and
   a fourth pump, driven by the motor, and operably associated with a fourth shock absorber.

14. The hydraulic actuator of claim 13, further comprising:
   a third accumulator in communication with the first accumulator, and the upper and lower working chambers of the second shock absorber;
   a fourth accumulator in direct communication with the third and fourth pumps;
   a fifth accumulator in direct communication with the third accumulator, and in communication with upper and lower chambers of the third shock absorber; and
   a sixth accumulator in direct communication with the third accumulator, and in communication with upper and lower chambers of the fourth shock absorber.

15. An hydraulic actuator circuit for use with first, second, third and fourth shock absorbers, wherein said shock absorbers each include a piston disposed within a housing, and wherein the piston helps define upper and lower working chambers within the housing of each of the shock absorbers, the hydraulic actuator circuit comprising:
   a motor;
   a pump, driven by the motor;
   a first accumulator in communication with the pump;
   a first switch valve in direct communication with the pump for controlling flow to the shock absorbers;
   a second switch valve in communication with the first switch valve for controlling flow only to the first and second shock absorbers;
   a third switch valve in communication with the first switch valve for controlling flow only to the third and fourth shock absorbers;
   first and second controlled restriction devices in communication with the first and second shock absorbers, respectively, and with the second switch valve, for assisting in controlling flow to the first and second shock absorbers; and
   second and third accumulators in direct communication with the first accumulator, and in communication with the first and second shock absorbers.

16. The hydraulic actuator circuit of claim 15, further comprising fourth and fifth accumulators in direct communication with the first accumulator, and in communication with the third and fourth shock absorbers.

17. The hydraulic actuator circuit of claim 15, further comprising third and fourth controlled restriction devices in communication with the third and fourth shock absorbers, respectively, and with the third switch valve, for assisting in controlling flow to the third and fourth shock absorbers.

* * * * *